United States Patent
Hollingsworth et al.

(10) Patent No.: US 7,627,464 B2
(45) Date of Patent: Dec. 1, 2009

(54) BOOTABLE SOLID STATE FLOPPY DISK DRIVE

(75) Inventors: Robert E. Hollingsworth, Smithtown, NY (US); Henry Wurzburg, Austin, TX (US)

(73) Assignee: Standard Microsystems Corporation, Hauppauge, NY (US)

( * ) Notice: Subject to any disclaimer, the term of this patent is extended or adjusted under 35 U.S.C. 154(b) by 1714 days.

(21) Appl. No.: 10/125,697

(22) Filed: Apr. 18, 2002

(65) Prior Publication Data

US 2003/0200379 A1 Oct. 23, 2003

(51) Int. Cl.
G06F 9/455 (2006.01)
G06F 13/00 (2006.01)
G06F 13/28 (2006.01)
G06F 9/00 (2006.01)
G06F 15/177 (2006.01)

(52) U.S. Cl. .................. 703/24; 711/102; 711/104; 713/2

(58) Field of Classification Search .............. 703/24; 711/115, 165, 103, 102, 104; 713/2, 193; 360/97.03, 98.1, 99.02
See application file for complete search history.

(56) References Cited

U.S. PATENT DOCUMENTS

| | | | |
|---|---|---|---|
| 4,572,509 A * | 2/1986 | Sitrick .................. 463/31 |
| 5,630,093 A * | 5/1997 | Holzhammer et al. ....... 711/115 |
| 5,781,190 A * | 7/1998 | Gorbet et al. ............... 715/748 |
| 5,802,363 A | 9/1998 | Williams et al. |
| 5,822,582 A * | 10/1998 | Doragh et al. ................. 713/2 |
| 5,930,358 A | 7/1999 | Rao |
| 6,098,120 A * | 8/2000 | Yaotani ....................... 710/16 |
| 6,178,487 B1 * | 1/2001 | Ruff et al. ................... 711/165 |
| 6,212,600 B1 | 4/2001 | Friedman et al. |
| 6,631,456 B2 * | 10/2003 | Leighnor et al. ............ 711/170 |
| 6,636,929 B1 * | 10/2003 | Frantz et al. ................. 710/313 |
| 7,047,356 B2 * | 5/2006 | Chen .......................... 711/113 |
| 2005/0223243 A1 * | 10/2005 | Moore et al. ................ 713/193 |

* cited by examiner

*Primary Examiner*—Paul L Rodriguez
*Assistant Examiner*—Andre Pierre Louis
(74) *Attorney, Agent, or Firm*—Meyertons Hood Kivlin Kowert & Goetzel, P.C.; Jeffrey C. Hood; Erik A. Heter

(57) ABSTRACT

A solid-state floppy disk drive is disclosed. In one embodiment, a solid-state floppy disk drive may include a non-volatile memory and a connector for coupling the solid-state floppy disk drive to a computer system. The non-volatile memory may store instructions and data which may allow the solid-state floppy disk drive to emulate a mechanical floppy disk drive having a bootable floppy disk inserted into it. The computer system may be booted using the solid-state floppy disk drive.

21 Claims, 4 Drawing Sheets

BOOTABLE SOLID STATE FLOPPY DISK DRIVE

BACKGROUND OF THE INVENTION

1. Field of the Invention

This invention relates to computer systems, and more particularly, to portable data storage and solid state drives.

2. Description of the Related Art

Floppy disk drives have been a feature of personal computers since their beginnings. In early personal computers, floppy disks were often the only hard storage media available, and floppy disk drives were the primary means of loading an operating system and other software into a computer system's memory. As hard disk drives became standard equipment on personal computers, floppy disks were still used as a means of distributing new software and transferring data/files from one computer to another. However, the function of loading operating system software was transferred to hard disk drives, as was often the case for applications software (which may have been initially installed via floppy disks).

Presently, both operating systems and applications software are typically consume a large portion of disk space. Distribution of applications software via floppy disks (which typically have a capacity of 1.44 MB) is rarely practical, as these programs and their associated files consume a large amount of disk space. Such files may include video, sound, and other formats which make them too large to be stored on a single floppy disk.

Despite these factors, floppy disk drives are typically still shipped as standard with personal computer systems. Floppy disk drives are still sometimes used by systems administrators or technicians in the event of a hard disk crash. A basic operating system, such as DOS (disk operating system) may oftentimes be loaded into the memory of a computer system that has suffered a hard drive crash. Having loaded an operating system into memory via the floppy disk drive, a technician or system administrator may begin troubleshooting and/or repairs to the computer system.

Other than the system recovery functions described above, the usefulness of floppy disks is relatively limited. Regardless, floppy disk drives are still included as standard equipment on many computer systems, primarily for legacy reasons. Since floppy disk drives are mechanical devices, they may be more prone to failure than solid-state devices. Furthermore, designing a computer system to include a floppy disk drive may place several extra space constraints on a computer system designer, not only for the disk drive itself but for the cabling and power connections associated with it. This problem may be especially pronounced with portable computer systems due to their small size.

SUMMARY OF THE INVENTION

A solid-state floppy disk drive is disclosed. In one embodiment, a solid-state floppy disk drive may include a non-volatile memory and a connector for coupling the solid-state floppy disk drive to a computer system. The non-volatile memory (e.g. a flash memory), may store instructions and data which may allow the disk drive to emulate a mechanical floppy disk drive having a bootable floppy disk inserted into it. The computer system may be booted using the solid-state floppy disk drive.

In one embodiment, the non-volatile memory of the solid-state floppy disk may include one or more partitions. A first partition may include a boot sector and an operating system, and thus may emulate a bootable floppy disk. The instructions and data stored in the first partition may be configured to emulate a file allocation table (FAT), a directory structure, and a file structure that is compatible with the operating system. In one embodiment, the operating system may be DOS (disk operating system), and the size of the first partition may be 1.44 megabytes (MB).

The non-volatile memory may include different partitions. A second or subsequent partition may be used to store various software, such as a utility program. Each subsequent partition may also be 1.44 MB in size. The first partition may include a disk swap utility program, which may allow the emulation of the switching of disks in a floppy disk drive. For example, if the first partition emulates a first floppy disk, and there exists a program to be run that is located in the second partition (which emulates a second floppy disk), the disk switch utility program may allow the emulation of the removal of the first disk and insertion of the second. This may allow the program in the second partition to be run as if it was being loaded and/or accessed from a second floppy disk. The disk switch utility program may allow the emulated switching between any number of partitions, or "disks," which may be present in the non-volatile memory.

The solid-state floppy disk drive may be configured for interfacing with a universal serial bus (USB) port. In one embodiment, the non-volatile memory of the solid-state floppy disk drive may be encased in a module sometimes referred to as a "key chain." The small size of the module may afford a large degree of portability. The module, including a partition emulating a bootable floppy disk, may be particularly useful to technicians and/or system administrators. Using the memory partition emulating the bootable floppy disk of the module may allow a system to be booted following a crashed hard disk drive. Once the system has been booted using the first partition, a technician or system administrator may also use various utility programs in the first or subsequent partitions to troubleshoot and recover the system. Such utility programs may include (but are not limited to) the disk switch utility program discussed above, diagnostic programs, network imaging programs, and utilities that allow the rebuilding of a hard disk drive image from a network. Thus, one embodiment of the invention provides a computer system having a requisite interface (e.g. USB) with no need for a mechanical floppy disk drive. This may result in significant cost and space savings to computer manufacturers who may be able to ship new computer systems without the mechanical disk drive.

BRIEF DESCRIPTION OF THE DRAWINGS

Other aspects of the invention will become apparent upon reading the following detailed description and upon reference to the accompanying drawings in which.

Figure 1:
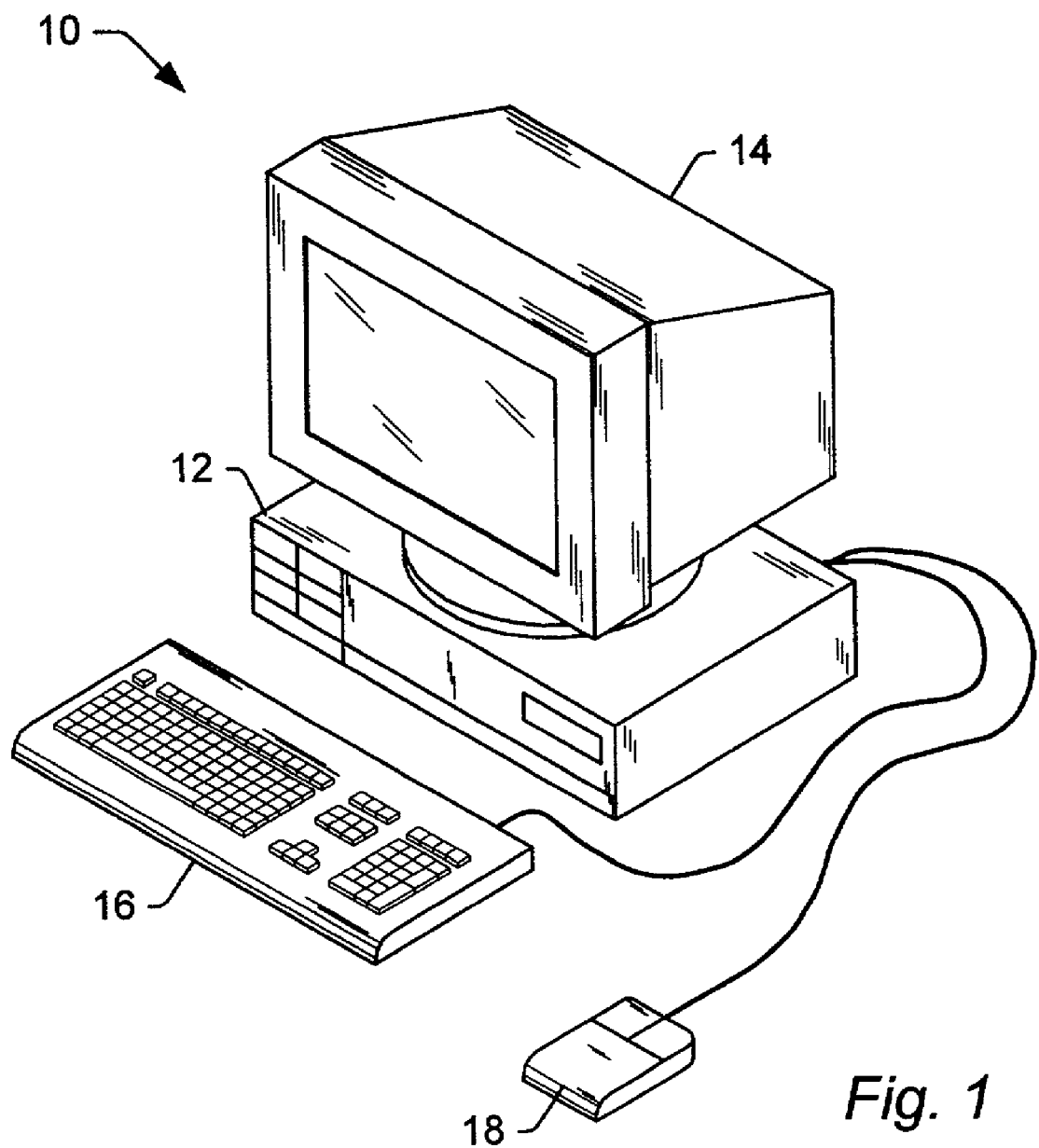
FIG. 1 is a perspective view of one embodiment of a computer system.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

Turning now to FIG. 1, a perspective view of one embodiment of a computer system is shown. The computer system may be configured for use with a solid-state floppy disk drive, which may be used to replace a mechanical disk drive. Furthermore, the system may be booted from the solid-state floppy disk drive.

Computer system 10 includes system unit 12 and display device 14 coupled to the system unit. Display device 14 may be one of several different types of displays or monitors (e.g. CRT, LCD, gas-plasma display, etc.). Computer system 10 may also have various input devices coupled to it, such as keyboard 16 and/or mouse 18. Other input devices are possible and contemplated, and may include trackballs, digitizers, tablets, six-degree of freedom input devices, head trackers, eye trackers, data gloves, body sensors, and so on. Computer system 10 may be configured to execute various types of application software, and may display 2D or 3D graphics on display device 14. The application software may be stored in memory, read from a server through a network connection, or may be read from one or more of several different storage devices. Such storage devices may include, but are not limited to, CD-ROM, DVD-ROM, computer tape, hard disk storage, and flash memory storage. The computer system may include several different types of peripheral interfaces, including a PCI (peripheral component interconnect) bus interface, a universal serial bus (USB) interface, and virtually any other type of available interface.

Other embodiments of computer system 10 are possible and contemplated. In particular, computer system 10 may also be a portable computer, such as a laptop, palmtop, etc., and may include an LCD or other type of display, as well as various types of input devices and interfaces.

Figure 2:
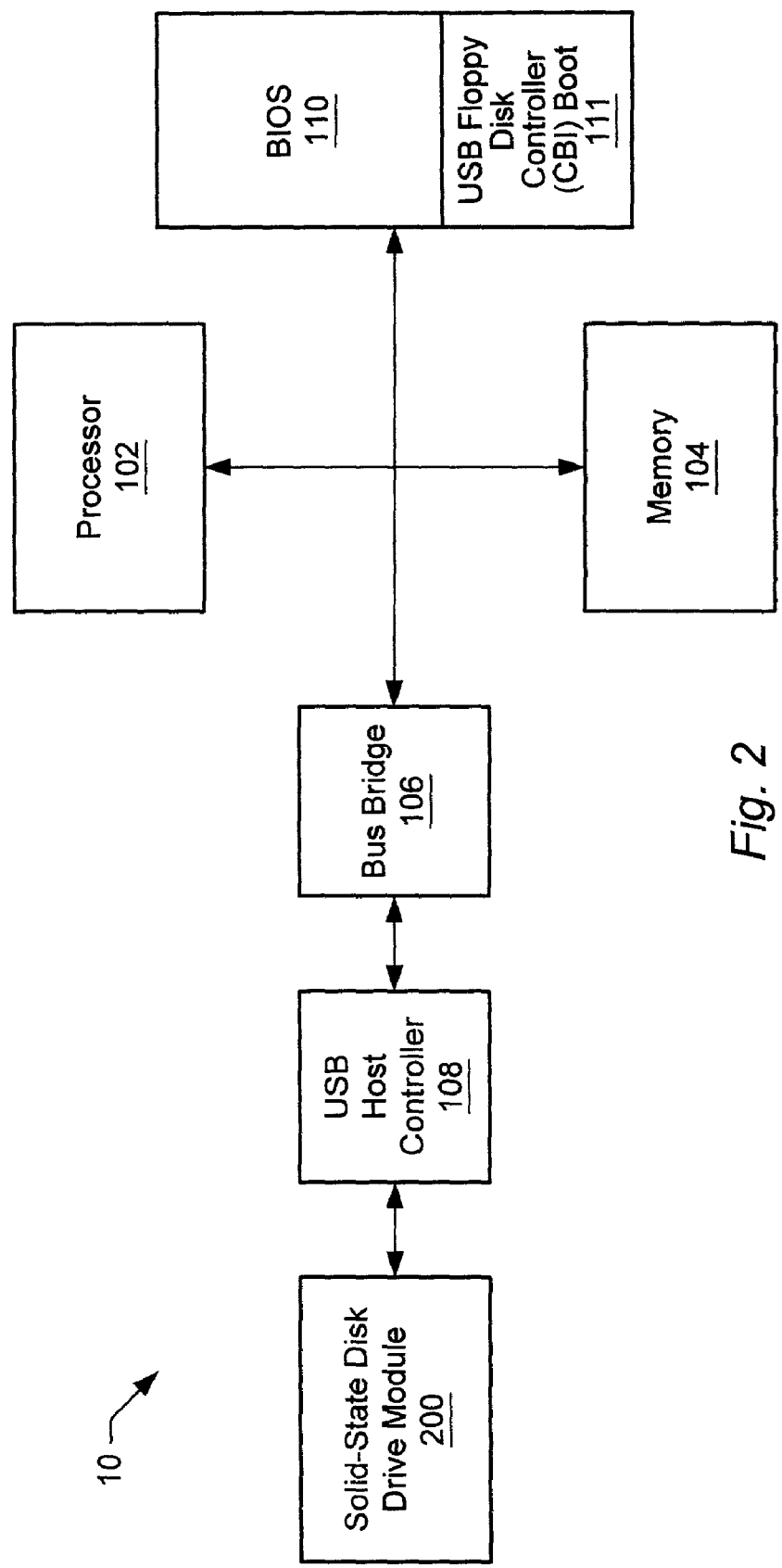
FIG. 2 is a block diagram of one embodiment of a computer system including a USB port configured to interface with a solid-state floppy disk drive module.

Moving now to FIG. 2, a block diagram of one embodiment of a computer system including a USB port configured to interface with a solid-state floppy disk drive module is shown. In the embodiment shown, computer system 10 includes processor 102, which may be coupled through one or more of a variety of types of busses to memory 104, bus bridge 106, and bios 110. Other embodiments including multiple processors 102 are possible and contemplated. Processor 102 may retrieve data and instructions from memory 104, which may be one of several different types of memory.

Both processor 102 and memory 104 may communicate with various peripheral devices through bus bridge 106. Bus bridge 106 may provide interfaces to one or more peripheral buses, which may be of different types. As shown in the drawing, one such peripheral bus may be USB, and thus bus bridge 106 may be coupled to USB host controller 108. USB host controller 108 may provide connections for coupling one or more USB devices to computer system 10, and may also allow a USB hub to be coupled to the computer system (thereby providing additional USB ports). USB host controller 108 may be configured to interface to USB peripherals of different versions, including USB 1.1 and USB 2.0. In the embodiment shown, solid-state floppy disk drive module (SSDDM) 200 is coupled to USB host controller 108, and may be either a USB 1.1 or USB 2.0 device. It is also contemplated that USB host controller 108 and SSDDM 200 may be compatible with versions of the USB protocol which may be developed in the future.

SSDDM 200 may include a non-volatile memory which may store instructions and/or data that may be used by computer system 10. The information stored on the non-volatile memory may be loaded into memory 104 through USB host controller 108 and bus bridge 106. SSDDM 200 may be used to boot computer system 10, as will be discussed in further detail below.

BIOS (basic input/output software) 110 may be used to configure computer system 10 at startup time. Upon initial application of power to the computer system, BIOS 110 may determine the various interfaces present in computer system 10. This may include determining the type of display included in computer system 10 and checking the various other system controllers (e.g. USB host controller 108) that may be present. Each of these interfaces may then be initialized. BIOS 110 may further check the system memory of computer system 10 to determine both the type and amount of memory present. Another important function of BIOS 110 is determining the boot disk, or storage device from which an operating system is to be loaded into memory 104 of computer system 10. BIOS 110 may check various devices for an operating system in a predefined order. The various devices may include (but are not limited to) a hard disk drive, a CD-ROM drive, or a floppy disk drive. In most embodiments, these devices are checked for the presence of an operating system to load into memory 104, in an order determined by the setup of the BIOS, until an operating system is found and then loaded for operation. In the embodiment shown, SSDDM 200 may appear to BIOS 110 as a floppy disk drive with a boot disk inserted, allowing operating system software to be loaded from the module. USB floppy disk controller 111 may be coupled to BIOS 110, and may provide control functions that allow operating system software to be loaded from SSDDM 200. It should be noted that USB floppy disk controller 111 may also be configured to provide control functions to a mechanical floppy disk drive.

Figure 3:
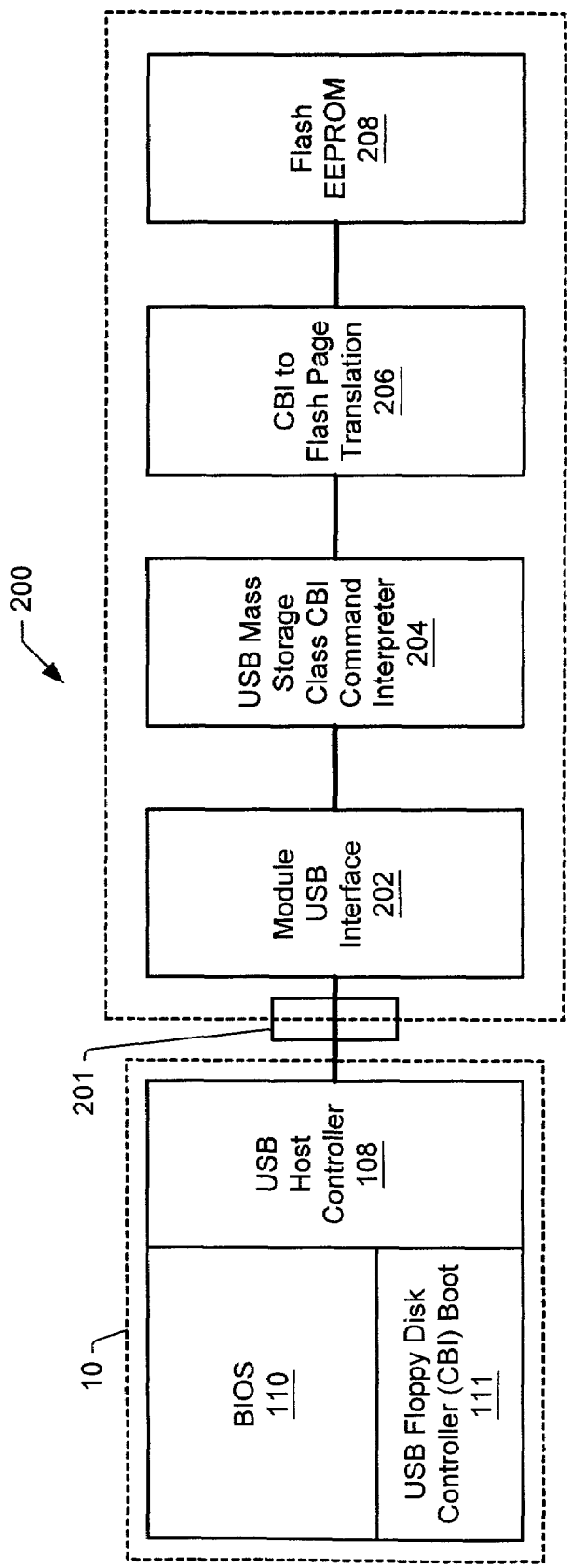
FIG. 3 is a block diagram illustrating one embodiment of solid-state floppy disk module interfaced to a computer system.

FIG. 3 is a block diagram illustrating one embodiment of a solid-state floppy disk drive module interfaced to a computer system. In the embodiment shown, SSDDM is coupled to USB host controller 108 of computer system 10 (of FIG. 2) via USB connector 201. Computer system 10 includes BIOS 110, USB host controller 108, and USB floppy disk controller 111, as well as the other elements shown in FIG. 2. SSDDM 200 includes a module USB interface 202. Module USB interface 202 may be configured to operatively couple the module to USB host controller 108 of computer system 10. USB interface 202 may provide various functions necessary for communications between the other portions of SSDDM 200 and computer system 10 (e.g. protocol conversions, etc.). It should be noted that SSDDM 200 is further contemplated for use with computer systems other than the embodiment shown in FIG. 2.

Module USB interface 202 may be coupled to CBI (control, bulk, interrupt) command interpreter 204. CBI command interpreter 204 may be configured to provide command interpretation functions, and may describe a class of mass storage device (in this case, flash memory, as will be discussed below) and the means by which it is communicated with via the USB. In particular, CBI command interpreter 204 may be configured for use with a USB floppy disk drive. The control functions provided by CBI command interpreter may include interpreting read and write commands as well as other functions related to the operation of a disk drive. The bulk functions may include the formatting of bulk data that is to be transferred to or from a disk in a disk drive (or the flash memory in this embodiment). The interrupt functions may include determining the status of the disk drive.

CBI command interpreter may be coupled to translation unit 206, shown here as CBI-to-Flash page translation 206. Translation unit 206 may perform page translation functions for data transfers to or from SSDDM 200. This may allow data translations between a floppy disk format and a flash memory format.

Translation unit 206 may be coupled to a non-volatile memory, in this case flash EEPROM (electrically erasable programmable read-only memory) 208. Other types of non-volatile memory are possible and contemplated. Flash EEPROM 208 may be written to or read from any number of times, and may hold its contents even when power is removed. This may make SSDDM 200 particularly useful in transferring data from one computer to another when the computers are not linked by a network.

In the embodiment shown, flash EEPROM 208 may be used to store data and software programs (i.e. instructions). In particular, EEPROM 208 may be configured such that SSDDM 200 emulates a floppy disk drive having a bootable floppy disk inserted. Thus, computer system 10 may be able to load operating system software from SSDDM 200 as if it were a mechanical floppy disk drive with a bootable floppy disk inserted. Flash EEPROM 208 may store an operating system (e.g. DOS), and may also store information allowing for the emulation of a file allocation table (FAT), a directory structure, and file structures that are compatible with the operating system. This may make SSDDM particularly useful in loading an operating system following the failure of a hard disk drive which may normally store an operating system.

During a system startup sequence, BIOS 110 may search for a boot device (i.e. a storage device from which to load the operating system software). BIOS 110 may be configured to control a USB host controller 108 and a USB floppy disk controller 111. BIOS 110 may be configured to select a floppy disk drive that is attached to USB host controller 108 as the boot device if no other device is selected before it. Since SSDDM 200 is designed to emulate a USB floppy disk drive, BIOS 110 may allow it to be selected as the boot device. The computer system then may load the operating system software from SSDDM 200 as if it were reading from a floppy disk.

Figure 4:
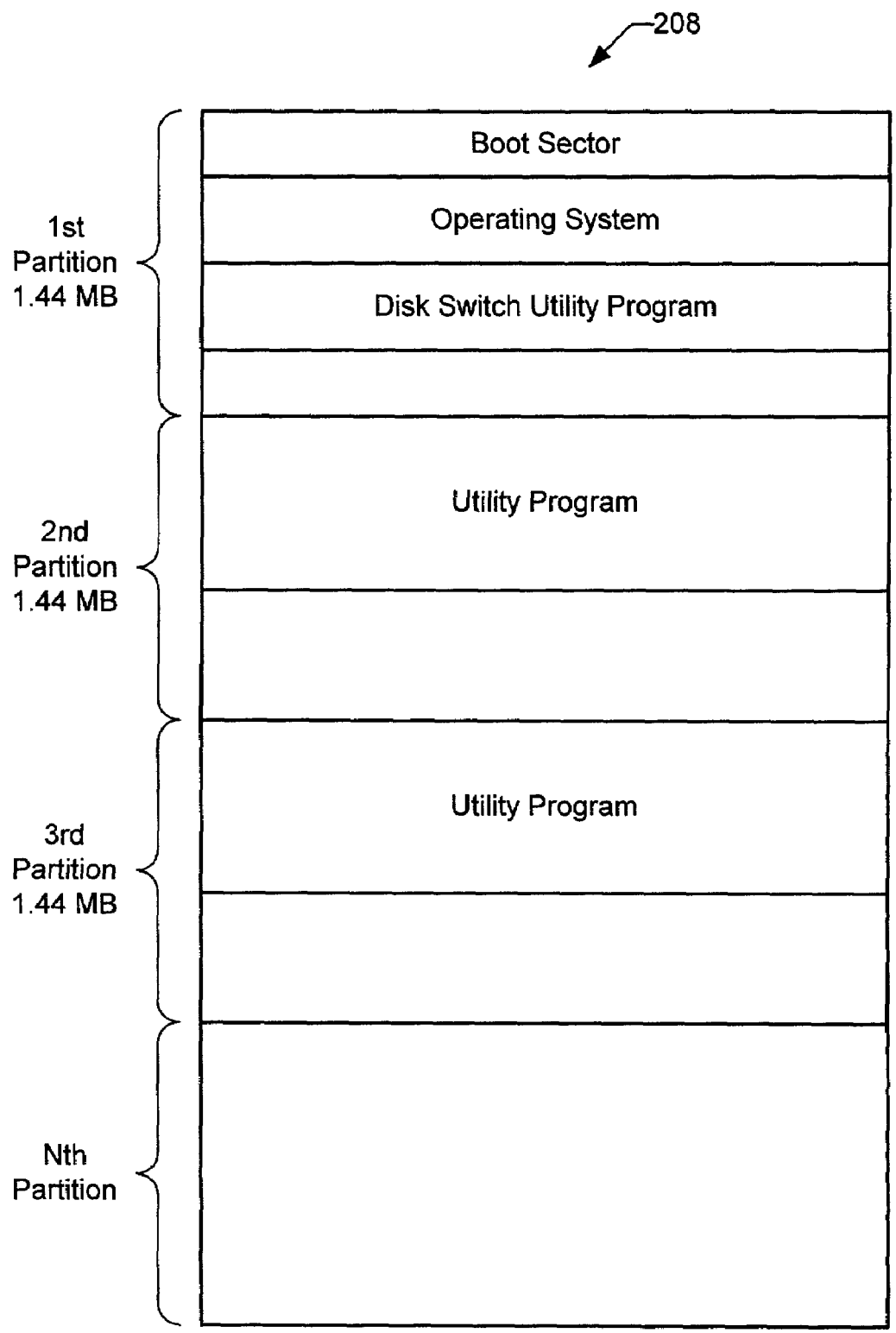
FIG. 4 is a block diagram illustrating one embodiment of the memory organization of a solid-state floppy disk drive having multiple partitions in a non-volatile memory, wherein at least some of the partitions may emulate a floppy disk.

Moving now to FIG. 4, a block diagram illustrating one embodiment of the memory organization of a solid-state floppy disk drive having multiple partitions in a non-volatile memory, wherein the partitions emulate individual floppy disks is shown. In the embodiment shown, flash EEPROM 208 may include N partitions. The first, second, and third partitions may be configured to emulate floppy disks, and may have a storage capacity of 1.44 MB. SSDDM 200 may be configured such that the first partition is read first in situations where it is to be used as a boot disk. The first partition may include a boot sector, and operating system, and a disk switch utility program. The boot sector may include information identifying the first partition as being bootable. An operating system may also be stored in the first partition. The operating system may be a relatively small operating system, such as DOS, and may provide a minimum of functionality. However, the operating system may be useful for running various utility and diagnostic programs on a computer system that is disabled due to various reasons, such as a hard disk failure.

The first partition may also include a disk switch utility program. The disk switch utility program may allow the emulation of a user removing a first floppy disk from the disk drive and inserting a second floppy disk. The disk switch utility program, in one embodiment, may display a selection menu on the system display which may allow for switching between each of the partitions that emulate a floppy disk.

In the embodiment shown, second and third partitions are also 1.44 MB in size, and are configured to emulate floppy disks. Both the second and third partitions may include utility programs. The utility programs may allow a system administrator or a technician to run diagnostic routines, rebuild a disk image from a network, or other utility type of function. In addition to separate utility programs in each partition, a larger program spanning multiple partitions may also be stored in flash EEPROM 208, with the disk switch utility program of the first partition allowing for the switching between the other partitions as necessary.

In the embodiment shown, an Nth partition may be used to emulate a floppy disk, and may include 1.44 MB of storage. Alternatively, the Nth partition may be larger than 1.44 MB, and may be used for bulk storage. Virtually any type of information may be stored in the Nth partition when it is configured for bulk storage. Such information may include data files, programs, disk images, and so on.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. An apparatus, comprising:
a solid state non-volatile memory, wherein the solid state non-volatile memory stores first program instructions which emulate a plurality of floppy disks, wherein at least one of the floppy disks is a bootable floppy disk, wherein the solid state non-volatile memory further stores second program instructions which are executable to emulate switching among the plurality of floppy disks; and
a connector electrically coupled to the solid state non-volatile memory for coupling the apparatus to a computer system.

2. The apparatus as recited in claim 1, wherein at least one of the plurality of floppy disks emulates a bootable floppy disk.

3. The apparatus as recited in claim 1, wherein the solid state non-volatile memory comprises a plurality of partitions, wherein each of the partitions emulates at least one of the plurality of floppy disks.

4. The apparatus as recited in claim 3, wherein at least one of the partitions comprises a boot sector and an operating system, wherein the at least one of the partitions emulates a bootable floppy disk.

5. The apparatus as recited in claim 4, wherein the at least one of the partitions has a memory size corresponding to a standard format floppy diskette.

6. The apparatus as recited in claim 4, wherein the at least one of the partitions has a memory size of 1.44 MB.

7. The apparatus as recited in claim 3, wherein at least one of the partitions comprises a boot sector and an operating system and emulates a bootable floppy disk, wherein the at least one of the partitions comprises the second program instructions which are executable to emulate switching among the plurality of floppy disks.

8. The apparatus as recited in claim 1, wherein the apparatus emulates a floppy disk drive which successively stores respective ones of the emulated plurality of floppy disks in a predetermined sequence.

9. The apparatus as recited in claim 1, wherein the second program instructions which are executable to emulate switching among the plurality of floppy disk drives comprise a disk swap utility program.

10. The apparatus as recited in claim 1, wherein the first program instructions are configured to emulate a file allocation table (FAT).

11. The apparatus as recited in claim 1, wherein the solid state non-volatile memory is an electrically-erasable programmable read-only memory (EEPROM).

12. The apparatus as recited in claim 1, wherein the solid state non-volatile memory is a flash memory.

13. The apparatus as recited in claim 1, wherein the connector is a universal serial bus (USB) connector.

14. The apparatus as recited in claim 13, wherein the connector is configured to couple the apparatus to a control/bulk/interrupt (CBI) USB device controller.

15. The apparatus as recited in claim 14, wherein the apparatus emulates a USB floppy disk drive which successively stores respective ones of the emulated plurality of floppy disks in a predetermined sequence.

16. A method, comprising:
    coupling an apparatus to an interface of a computer system, wherein the apparatus comprises a solid state non-volatile memory, wherein the solid state non-volatile memory stores program instructions;
    executing the program instructions on the solid state non-volatile memory, wherein said executing comprises emulating a plurality of floppy disks being loaded successively on a floppy disk drive.

17. The method as recited in claim 16, wherein said emulating comprises at least one of the plurality of floppy disks emulating a bootable floppy disk.

18. The method as recited in claim 16, wherein the solid state non-volatile memory comprises a plurality of partitions, wherein said emulating comprises each of the partitions emulating at least one of the plurality of floppy disks, wherein said emulating comprises the at least one of the partitions emulating a bootable floppy disk.

19. The method as recited in claim 16, wherein said emulating comprises the apparatus emulating a floppy disk drive which successively stores respective ones of the plurality of floppy disks in a predetermined sequence.

20. The method as recited in claim 16, wherein at least a portion of the program instructions comprise a disk swap utility program, wherein said executing comprises executing the disk swap utility program to swap among the plurality of floppy disks in the predetermined sequence.

21. A computer readable solid state non-volatile memory medium, comprising:
    first program instructions which are executable to emulate a plurality of floppy disks, wherein at least one of the floppy disks is a bootable floppy disk;
    second program instructions which are executable to emulate switching among the plurality of floppy disks;
    wherein the computer readable solid state non-volatile memory medium emulates a floppy disk drive which successively stores respective ones of the plurality of floppy disks in a predetermined sequence.

* * * * *

UNITED STATES PATENT AND TRADEMARK OFFICE
CERTIFICATE OF CORRECTION

PATENT NO. : 7,627,464 B2  Page 1 of 1
APPLICATION NO. : 10/125697
DATED : December 1, 2009
INVENTOR(S) : Hollingsworth et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2263 days.

Signed and Sealed this

Second Day of November, 2010

David J. Kappos
*Director of the United States Patent and Trademark Office*